June 30, 1970 A. K. CHADDHA ET AL 3,518,365

KEYED FINE TUNE INDICATOR FOR COLOR OR MONOCHROME TV

Filed Feb. 9, 1967 3 Sheets-Sheet 1

Inventors:
Aroon K. Chaddha
Trevor L. Jones
Sam P. Stamatis
By Robert L. Slater, Jr.
Atty.

KEYED FINE TUNE INDICATOR FOR COLOR OR MONOCHROME TV

Filed Feb. 9, 1967 3 Sheets-Sheet 2

Inventors:
Aroon K. Chaddha
Trevor L. Jones
Sam P. Stamatis
By: Robert L. Slater, Jr.
Atty.

KEYED FINE TUNE INDICATOR FOR COLOR OR MONOCHROME TV

Filed Feb. 9, 1967 3 Sheets-Sheet 3

Inventors:
Aroon K. Chaddha
Trevor L. Jones
Sam P. Stamatis
By Robert L. Slater, Jr.
Atty.

United States Patent Office 3,518,365
Patented June 30, 1970

3,518,365

KEYED FINE TUNE INDICATOR FOR COLOR OR MONOCHROME TV

Aroon K. Chaddha, Melrose Park, Trevor L. Jones, Chicago, and Sam P. Stamatis, Glenview, Ill., assignors to Wells-Gardner Electronics Corporation, Chicago, Ill., a corporation of Illinois Filed Feb. 9, 1967, Ser. No. 614,956
Int. Cl. H04n 5/50
U.S. Cl. 178—5.8 5 Claims

ABSTRACT OF THE DISCLOSURE

A fine tuning visual indicator for television receivers utilizing a keyed pulse simultaneously with the video carrier signal in a gate circuit to actuate visual indicating means.

BACKGROUND

This invention relates to television receivers, both monochrome and color, and pertains in particular to visual tuning indicators.

Channel selectors normally tune television receivers only approximately. Variation in the mixer and local oscillator circuits within the receiver and other second order disturbances affect the precision of tuning in a receiver and accordingly the quality of reception and the stability of the receiver. Fine tuning controls in television receivers of the intercarrier type may comprise a variable reactance placed across the mixer and local oscillator circuits. Other fine tuning controls comprise variable means by which the local oscillator frequency may be slightly altered. The fine tuning controls permit the operator to make small increment changes in the IF carrier frequency wherewith the IF carrier signal may be centered in the IF amplifier frequency passband. When the receiver is thus tuned, the IF video carrier, the IF sound carrier, and the various synchronization pulses appear at the output of the IF amplifier and beyond in proper respective amplitude and phase relationship. On the other hand, when the IF carrier is not centered on the IF amplifier passband some distortion and even loss of the sound and picture information and reduction in amplitude of the synchronization pulses may occur.

In monochrome television receivers fine tuning is accomplished by adjusting the fine tuning control to align the IF carrier with the IF amplifier frequency passband. When the receiver is so tuned the sound carrier and video or picture carrier are at maximum amplitude and in the proper amplitude and phase relationships with one another, and the receiver is properly locked onto the sync pulses. Color television receivers have still more stringent tuning requirements than monochrome. In addition to the picture and sound carriers, the color information signal must be amplified in the IF amplifier without distortion and maintained in proper relative position with respect to the picture carrier. Accordingly, the allowable frequency tolerance is more exacting for matching the color IF carrier signal to the precise center of the IF amplifier than in monochrome receivers.

Earlier systems for indicating the status of the tuning of radio receivers depended upon comparison of the IF carrier frequency with a fixed value when sampled at the output of the mixer circuit. When the receiver was tuned, this condition could then be easily indicated by means of a small incandescent light or by other visual indicator.

Some FM radio receivers in past times have utilized special incandescent lamps responsive to peaking circuits to indicate when the IF carrier frequency at the mixer circuit output was precisely matched to the center of the passband of the IF amplifier. Such a system, however, is not readily adapted to the broad band television transmitted signal.

In a television receiver, whether color or monochrome, the conditions for indicating that the finely tuned state had been obtained are more complex. The earlier television receiver tuning indicators depended upon continuously sensing a signal indicative of the status of the tuning in the receiver. All the signals utilized heretofore that are suitable indices of the tuning of television receivers are modulated and in general approach zero amplitude when the modulation is zero. Various complex means were utilized to overcome the loss of the tuning index signal. One earlier inventor disclosed a tuning indicator for television receivers which was actuated by sampling the sound carrier and the video carrier signals from points beyond the input stage of the IF amplifier. The video carrier and sound carrier signals were then mixed, the resulting beat signal was detected, rectified and applied across the cathode and control grids of the picture tube. When the resultant beat signal was at a maximum the receiver was properly tuned and the picture tube with the DC beat signal applied as stated above would be at a maximum brightness.

The present invention, as will be further described below, utilizes periodic sampling or time sharing of the tuning index signals and furthermore samples the signals during an interval in the transmission of the video signal that the modulation is zero and the proper tuned signals are constants.

There remained a need prior to the present invention, however, for a television receiver tuning indicator which is applicable to either monochrome or color receivers and is responsive to monochrome or color transmitted signals. An ideal tuning indicator would preferably be simple in construction, reliable, and not require subjective judgment on the part of the person adjusting the receiver. A positive on or off indicator is preferred.

SUMMARY OF INVENTION

Briefly stated the present invention utilizes a principle heretofore not adapted to actuate visual tuner indicators. Our invention utilizes any of several combinations of two signals derived from a television receiver, one signal of which may be pulsed or "keyed" to actuate a gate circuit which in turn provides the energy to drive a light source or meter indicator. The tuning indicator circuit is a gate circuit in which current flows when the two signals derived from the properly tuned circuit are simultaneously present. The indicator light source or meter is selected to respond continuously to a pulsed or intermittent power supply.

Accordingly, one object of the present invention is to provide a general purpose precise reliable television receiver tuning indicator.

Another object of the present invention is to provide a television receiver tuning indicator which requires no subjective judgment by the operator.

Another object of the present invention is to provide a television receiver visual tuning indicator applicable to monochrome and color television receivers and responsive to both monochrome and color transmitted signals.

Still another object of the present invention is to provide a visual tuning indicator which does not alter the normal functioning of the television receiver.

Another object of our invention is to provide a tuning indicator for a television receiver that intermittently samples the picture carrier during the synchronization pulse intervals as an indication of the status of tuning of the receiver.

Yet another object of our invention is to sample the picture carrier during an interval when the picture carrier signal will have a constant amplitude and thus provide for a constant amplitude input to the indicator and therewith permit construction of a fixed intensity on or off visual indicator.

These and other objects and advantages of our invention will be apparent from the following drawings and specifications and claims.

DRAWINGS

FIG. 1 illustrates in schematic block diagram form a preferred embodiment of our invention adapted to a conventional television circuit.

FIG. 2*a* illustrates the IF amplifier output signal curve for a correctly tuned television receiver.

FIG. 2*b* illustrates the IF amplifier output signal curve for a television receiver tuned to a frequency below the correct adjustment.

FIG. 2*c* illustrates the IF amplifier output signal curve for a television receiver tuned to a frequency too high for correct adjustment.

DESCRIPTION OF PREFERRED EMBODIMENT OF THE INVENTION

Figure 1:
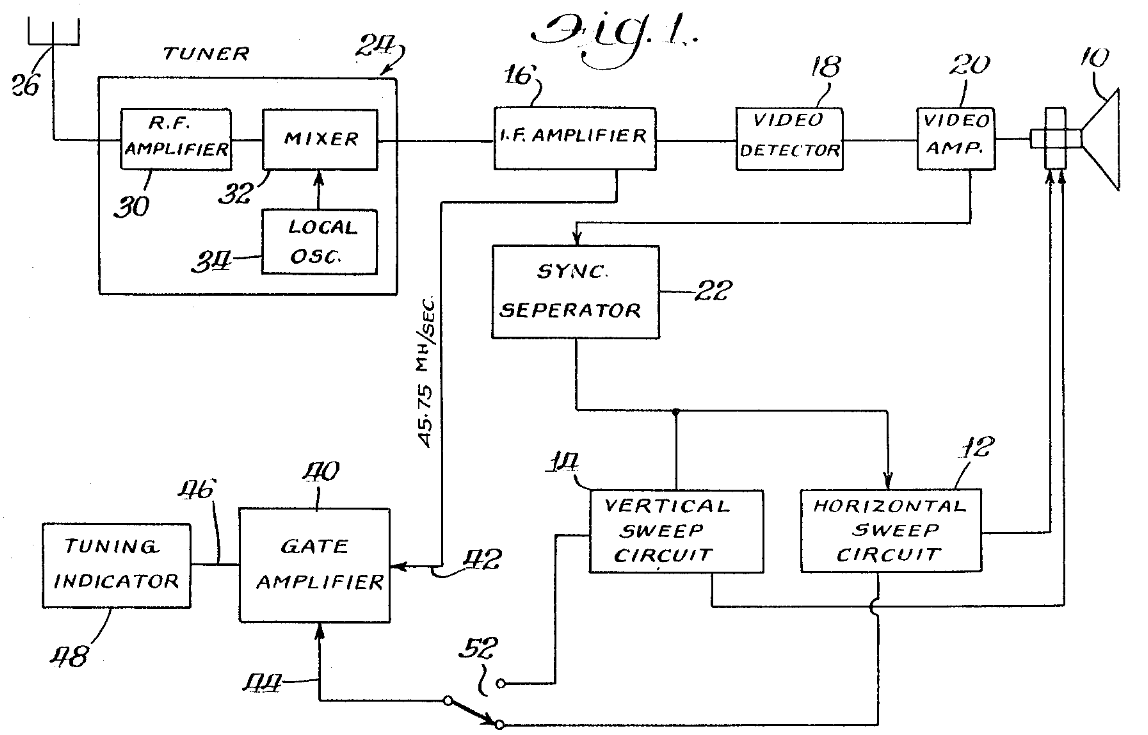

A preferred embodiment of our invention is illustrated in FIG. 1 in block diagram form along with generalized schematic material descriptive of sections of a television receiver. The connections between our invention and a typical television receiver circuit are shown. The television receiver comprises a kinescope or picture tube 10, to which are coupled connections with the output of horizontal sweep circuit 12 and a vertical sweep circuit 14. The video signal derived from an IF amplifier 16 is passed through a video detector circuit 18 and video amplifier 20 en route to the kinescope 10. The horizontal sweep circuit 12 and the vertical sweep circuit 14 are driven by a sync separator circuit 22 which derives an input signal from the video amplifier 20. A video tuner section 24 connects at the input to an antenna 26 and supplies the input signal to the IF amplifier 16. The tuner section 24 is normally comprised of an RF amplifier 30, a mixer circuit 32 and a local oscillator 34. Fine tuning controls, not shown in the schematic drawing, enable the operator to adjust the frequency at the output of the mixer circuit 32 to match the frequency passband of the IF amplifier 16.

Figure 2:
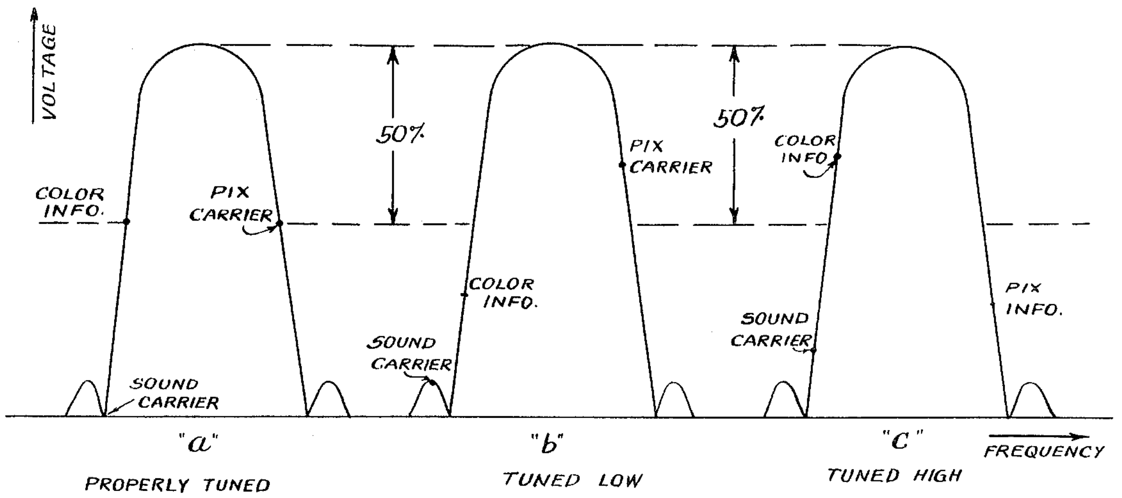

By referring to FIGS. 2*a*, 2*b*, and 2*c* the effects of mistuning of the receiver may be readily visualized. The FIG. 2 curves show the envelope of the output or response curve of the IF amplifier 16, wherein the abscissa is frequency and the ordinate is amplitude. The relationships between the sound, color and picture information are noted in the illustration.

The illustrated embodiment of our invention is comprised of a gate circuit 40 having two input terminals 42 and 44 and one output terminal 46, in combination with a visual indicator 48. The video carrier derived from the output terminal of the IF amplifier 16 is applied to the first input terminal 42 and a keying pulse derived from either the horizontal sweep circuit 12 or the vertical sweep circuit 14 is applied to the second input terminal 44. The output of the gate is applied to and actuates the visual indicator 48.

The two position selector switch 52 through which a keying pulse is selected for input to the gate 40 would not of course be included in a practical embodiment of our invention but is shown in the illustration to emphasize the fact that a keying pulse derived from either the vertical or horizontal sweep circuits is adequate for the purposes of our invention.

Figure 3:
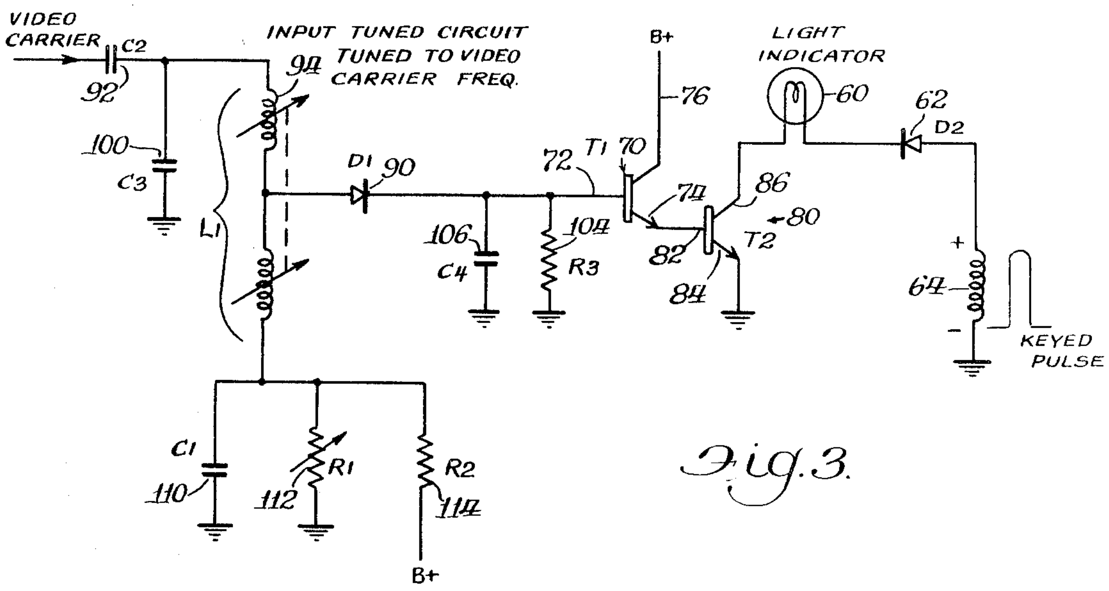
FIG. 3 is a schematic circuit diagram illustrative in greater detail of the preferred embodiment of our invention illustrated in FIG. 1.

The circuit shown in FIG. 3 illustrates in detail the gate circuit 40 and visual indicator 48 of the FIG. 1 embodiment of our invention.

The visual indicator illustrated is a two terminal light source 60. A diode $D_2$ shown at 62 connects by one terminal to the light source, and by the second terminal through a small coupling transformer 64 to the output of either the horizontal or vertical sweep pulse circuits.

The gate circuit 40 comprises essentially two NPN transistors $T_1$ shown at 70 having a base 72, emitter 74 and collector 76, and $T_2$ shown at 80 having a base 82, an emitter 84 and a collector 86. The emitter 74 of $T_1$ is connected to the base 82 of $T_2$. The collector 86 of $T_2$ is connected to the second terminal of the light source 60. The collector 76 of $T_1$ is connected to a $B^+$ DC voltage source and the emitter 84 of $T_2$ is grounded.

Input of the video carrier signal derived from the output of the IF amplifier 16 is passed to the base 72 of $T_1$ through a tuned input circuit described below and a diode $D_1$ shown at 90.

The tuned input circuit is comprised of an input capacitor $C_2$, 92, and a variable inductance $L_1$ shown at 94. A grounded capacitance $C_3$, 100, completes the tuned input circuit. The diode $D_1$ at 90 is connected to the tuned circuit at a tapped terminal of inductance $L_1$.

Bias control of transistors $T_1$, 70, and $T_2$, 80, and accordingly control over the conduction interval of the gate circuit is obtained by means of the bias circuit comprised of variable resistance $R_1$ at 112 and resistor $R_2$ at 114. Capacitor $C_1$ shown at 110 functions as an AC ground. The resistance $R_2$ is connected between the inductance $L_1$ at 94 and a source of DC voltage shown as $B^+$.

Figure 5:
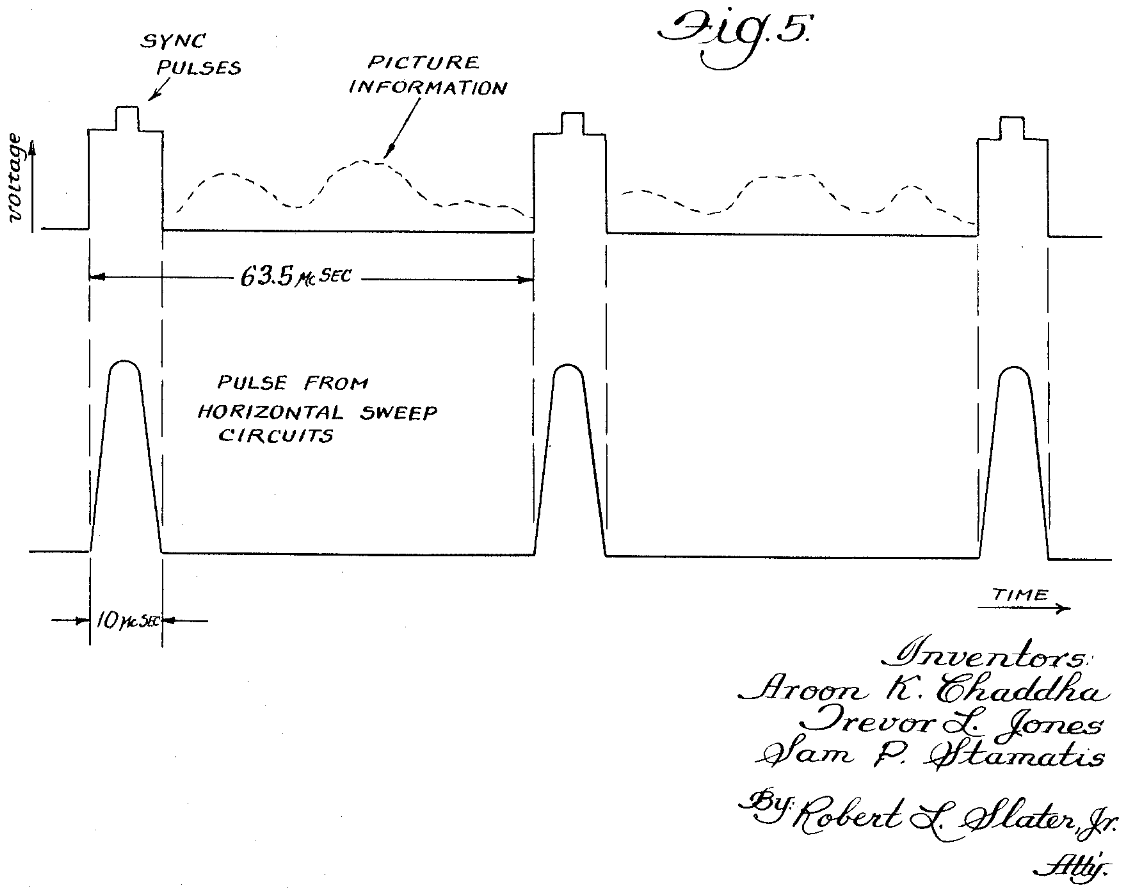
FIG. 5 illustrates the time relationship between the conductive cycle of the embodiment of our invention illustrated in FIG. 3 and the video signal.

The operation of the detector circuit may be broadly described as follows: Diode $D_1$ shown at 90 detects a portion of the IF signal present at inductor $L_1$ and thus recovers the video signal present at the base 72 of transistor $T_1$ shown at 70 in FIG. 3. Reference is made to FIG. 5 which illustrates in the upper portion thereof the video signal as may be present at the base of transistor $T_1$ or as may appear across resistor $R_3$ shown at 104. A keyed pulse, such as the horizontal sweep sync pulse present at diode $D_2$, 62, permits current to flow through the light indicator 62 during the interval that the keyed pulse is present. No current flows through the light indicator during the intervals between successive keyed pulses.

Figure 4:
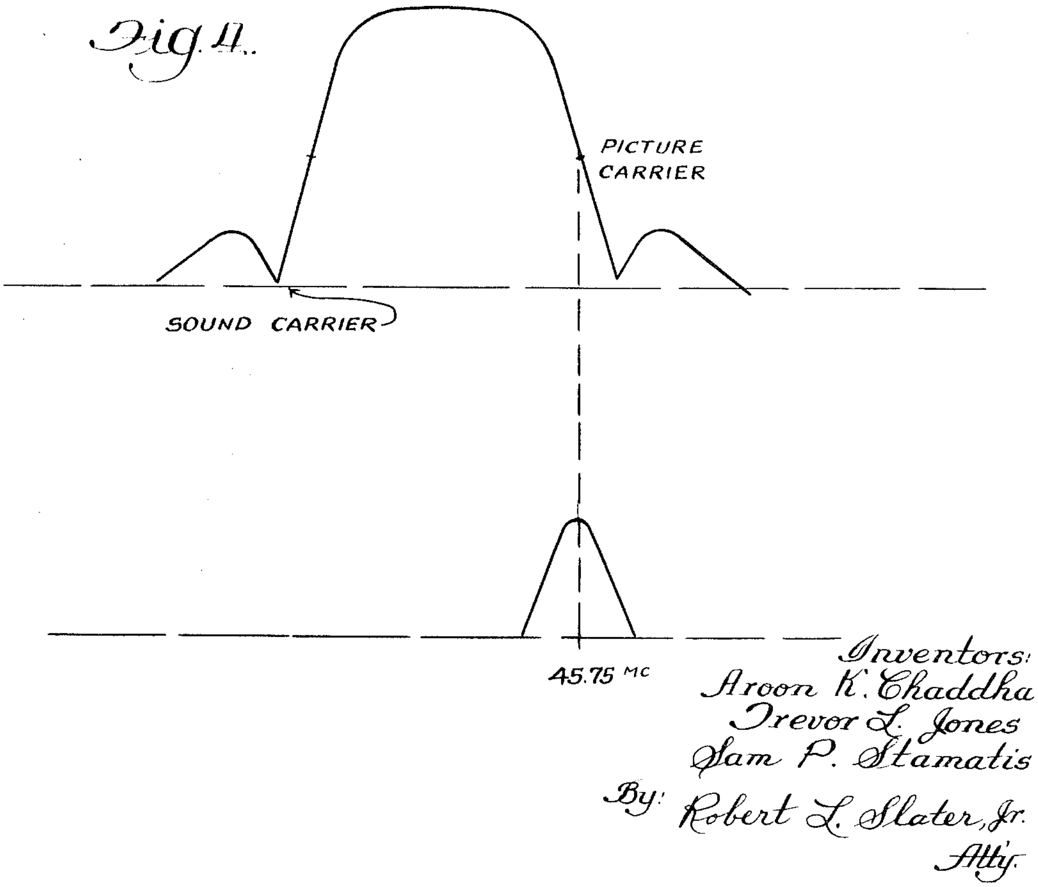
FIG. 4 illustrates the relationship between the IF amplifier response curve and the selectivity of the circuit shown in FIG. 3.

Provision is made in the input of the indicator circuit wherein the tuned input circuit may be adjusted by means of the variable inductance $L_1$ at 94 so that the tuned input circuit response will be precisely aligned with the passband of the IF amplifier 16. FIG. 4 more clearly illustrates the relationships between the IF amplifier response curve shown in the upper portion of FIG. 4, and the tuned circuit response of the indicator circuit shown on the lower portion of FIG. 4. When the picture carrier is varied from its proper frequency as a result of inadequate tuning of the television receiver the picture carrier is displaced from the 45.75 mc. frequency as may be readily visualized by reference to FIG. 4. In FIG. 4 the abscissa is frequency and the ordinate is voltage; the upper and lower curves shown in the figure are envelopes of the IF amplifier 16 output and the tuned input circuit respectively. Accordingly the signals propagated through the indicator tuned input circuit and into the indicator circuit must be substantially aligned with the center frequency of the passband of the tuned input circuit. Signals from a mistuned IF amplifier 16 will not enter into the indicator circuit through the tuned input circuit and accordingly the indicator light source will not be powered. The input frequency tolerance of the indicator may be adjusted to permit more or less displacement from a state of precise tuning of the IF amplifier response curve as may be desired.

FIG. 3 illustrates a circuit utilizing NPN transistors in the positions for the transistors $T_1$ and $T_2$ shown at 70 and 72 respectively. In the event PNP transistors are substituted for the transistors $T_1$ and $T_2$ the polarity of diodes $D_1$ at 90 and $D_2$ at 62 would require reversal and the DC voltage applied to the collector 76 of transistor $T_1$ and applied to the bias resistor $R_2$ would be altered from positive to negative DC voltage. The input keyed pulse introduced through diode $D_2$ at 62 in the circuit of FIG. 3 is a positive pulse. The pulse introduced for a PNP transistor circuit described last above would normally be a negative pulse.

Our fine tuning indicator invention, whether the two transistor or single transistor variation, can be functionally described as an AND gate having one output terminal and two input terminals. Current flows in the output of the AND gate thereby powering the visual light or meter indicator, when two simultaneous input signals are present. The two input signals are first the video signal present at diode $D_1$ and the base of the transistor $T_1$ or transistor 120 in the FIG. 6 embodiment, and second the keyed pulse signal periodically present at diode $D_2$.

FIG. 5 illustrates the envelope of the video signal along the upper axis of which the abscissa is time and the ordinate is voltage. The picture information is carried on a modulated video carrier. During the interval of the sync pulses the video carrier is present but unmodulated. During the interval of the sync pulses the horizontal sweep circuit pulse, for instance, is present but is not present during the interval between the sync pulses. The embodiment of our invention described in FIGS. 1 and 3 utilizes the fact that the video carrier may be modulated between the sync pulses and result in zero or very small amplitude. However, during the interval of the sync pulses the video signal amplitude is constant. By sampling simultaneously the video carrier during the interval of the sync pulses and sampling a keyed pulse such as the horizontal sweep pulse as shown in the lower portion of FIG. 5, the state of tuning of the receiver may be determined and indicated by the flow of current through the light source 60. In FIG. 5 the video signal is shown in the time axis; abscissa is time in micro seconds and the ordinate is voltage. The lower curve shows the time spacing of the horizontal sync pulses.

Figure 6:
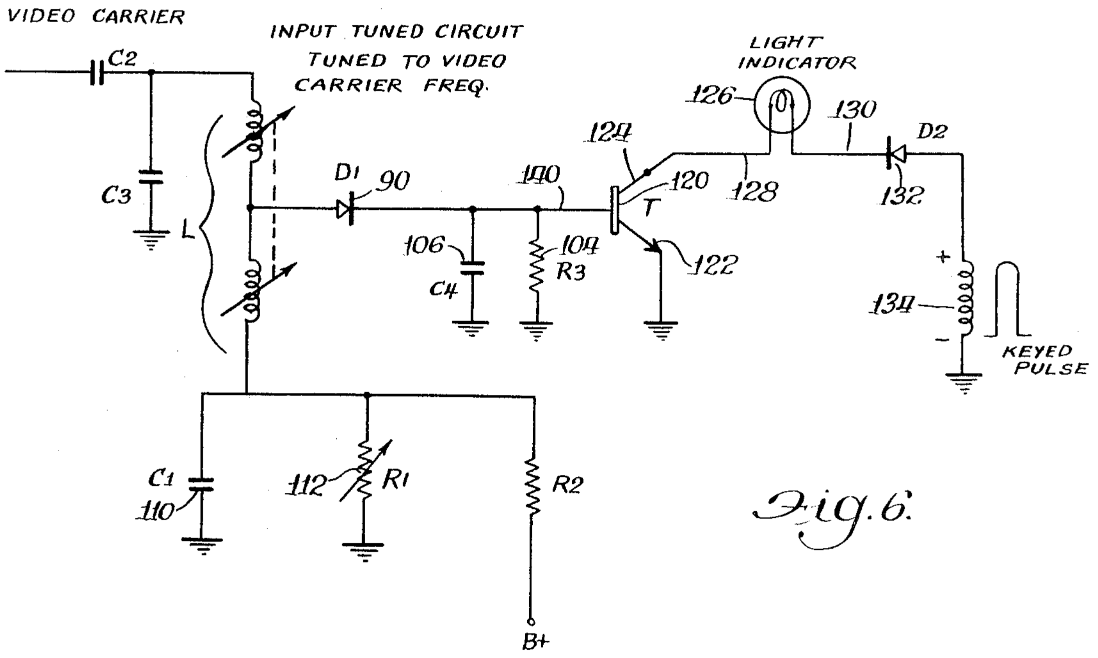
FIG. 6 is a schematic circuit diagram illustrating a variation of the embodiment of our invention shown in FIG. 3.

A variation on the embodiment of our invention described above may be readily visualized by reference to FIG. 6. The FIG. 6 circuit is in all respects identical to that shown in FIG. 3 excepting a single NPN transistor has been utilized in the embodiment illustrated in place of the two NPN transistors shown in FIG. 3. Returning now to FIG. 6, transistor 120 having an emitter 122 and a collector 124 is connected through the collector 124 to the first terminal 128 of the light source 126. The second terminal 130 of the light source 126 is connected to a small coupling transformer 134 through a diode $D_2$ shown at 132. Keyed pulses are passed through the coupling transformer 134 and the diode $D_2$ at 132 to the light indicator 126. The base 140 of transistor 120 is biased by means similar to the bias arrangement of the circuit shown in FIG. 3. The passband of an input tuning circuit is tuned to the video carrier frequency 45.75 mc. Current flows through the light indicator 126 of the circuit shown in FIG. 6 when a properly tuned video carrier signal is rectified and applied to the base 140 of the transistor $T_1$ at 120 and simultaneously a keyed pulse is present at coupling transformer 134 and the diode $D_2$, 132. Operation of the circuit utilizing the single transistor 120 is in all other respects the same as that described above in connection with the circuit shown in FIG. 3.

The foregoing specifications and descriptions are intended as illustrative of our invention, the scope of which is defined in the following claims.

What is claimed is:

1. A visual fine tuning indicator for a television receiver wherein the receiver comprises a local oscillator-mixer circuit, an intermediate frequency (IF) amplifier means, and horizontal and vertical sweep pulse circuits for generating respectively horizontal and vertical sweep pulses, the tuning indicator comprising in combination a circuit having a first and a second transistor, the transistors having respective base, emitter and collector leads, the base of the second transistor being connected to the emitter lead of the first transistor, a two terminal light source, the collector of the second transistor being connected to one of the light terminals, a first diode, the second terminal of the light source being connected to one of the sweep pulse circuits through the first diode, a tuned circuit and a second diode, the base lead of the first transistor being connected to the IF amplifier through the tuned circuit and the second diode, whereby when the local oscillator-mixer circuit is tuned to yield an IF signal in the passband frequency of the IF amplifier, said IF signal will pass through the tuned circuit and the second diode and to provide a detected video signal at the base of said first transistor, said indicator light being energized when said detected video signal and the sweep pulse are being applied to said tuning indicator.

2. The visual tuning indicator of claim 1 wherein the two terminal light source is deleted and a two terminal meter is substituted therefor.

3. In a television receiver having a picture tube, a tuner comprised of an RF amplifier, a mixer circuit and a local oscillator, an intermediate frequency (IF) amplifier, a video amplifier and horizontal and vertical sweep and deflection circuit means providing respectively a horizontal sweep signal and a vertical sweep signal, the IF amplifier being adapted to amplify the video carrier wave and the deflection circuit means providing respectively a horizontal sweep signal and a vertical sweep signal, the IF amplifier being adapted to amplify the video carrier wave and the deflection circuit means being adapted to respond to a plurality of sweep pulses, and fine tuning means for tuning the IF amplifier, said fine tuning means comprising:

- a gate means comprising a transistor means having a base, emitter and collector;
- video detector means interposed between the IF amplifier and said base for detecting video from the video carrier to provide a first input voltage at said base;
- a rectifier means for rectifying one of said sweep signals to provide a second input voltage; and
- an indicator means interposed between the collector and the rectifier means, said indicator means being activated when the IF amplifier is tuned to provide said first input voltage and said second input voltage whereby said transistor means conducts.

4. The receiver of claim 3 includes:

- a transformer means, said rectifier means comprising a diode connected on one end to a visual indicator means and on the opposite end to said transformer means, said transformer means being coupled to the output of one of said sweep circuits, said transistor means conducting at a substantially maximum level when the IF amplifier is properly tuned and conducting at less than said maximum when the IF amplifier is off from said properly tuned condition.

5. In a television receiver having a picture tube, a tuner comprised of an RF amplifier, a mixer circuit, and a local oscillator, an intermediate frequency (IF) amplifier, a video amplifier and horizontal and vertical sweep and deflection circuit means providing respectively a horizontal sweep signal and a vertical sweep signal, the IF amplifier being adapted to amplify the video carrier wave and the deflection circuit means being adapted to respond to a plurality of sweep pulses, and fine tuning means for tuning the IF amplifier, said fine tuning means comprising:

a gate means having a first input, a second input and an output, said gate means including a first transistor and a second transistor, said first transistor comprising a first base, a first emitter and a first collector and said second transistor comprising a second base, a second emitter and a second collector, the first emitter being connected to the second base, said first input being connected to said first base, said output connected to the second collector;

video detector means interposed between the IF amplifier and said first input for detecting video from the video carrier to provide a first voltage at said first input;

a rectifier means interposed between said second input and one of said sweep circuit means for rectifying the corresponding sweep signal to provide said second voltage at said second input; and indicator means connected to the output of said second collector and said second input, whereby said first voltage causes said first transistor to conduct and said second voltage causes said second transistor to conduct when the first transistor is conducting to thereby activate said indicator means to enable said IF amplifier to be tuned.

References Cited

UNITED STATES PATENTS 2,910,530 10/1959 Clark ............... 178—5.8

ROBERT L. GRIFFIN, Primary Examiner

R. L. RICHARDSON, Assistant Examiner

U.S. Cl. X.R.

178—7.3